Figure 1:
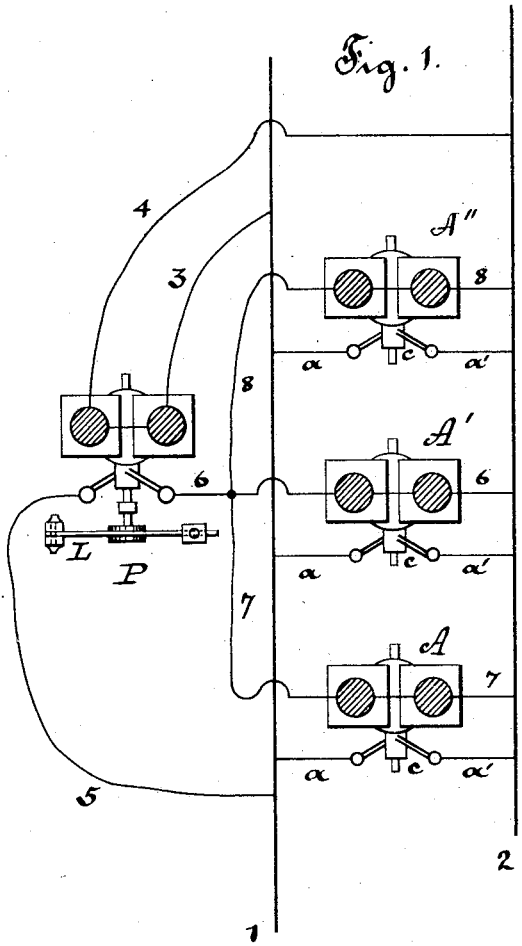

(No Model.)  2 Sheets—Sheet 1.

T. A. EDISON.
Regulating the Generation of Electric Currents.

No. 239,374.  Patented March 29, 1881.

Attest:
O. D. Mott
M. J. Hagett

Inventor:
Thos. A. Edison
Attys.

N. PETERS, PHOTO-LITHOGRAPHER, WASHINGTON, D. C.

(No Model.) 2 Sheets—Sheet 2.
T. A. EDISON.
Regulating the Generation of Electric Currents.
No. 239,374. Patented March 29, 1881.
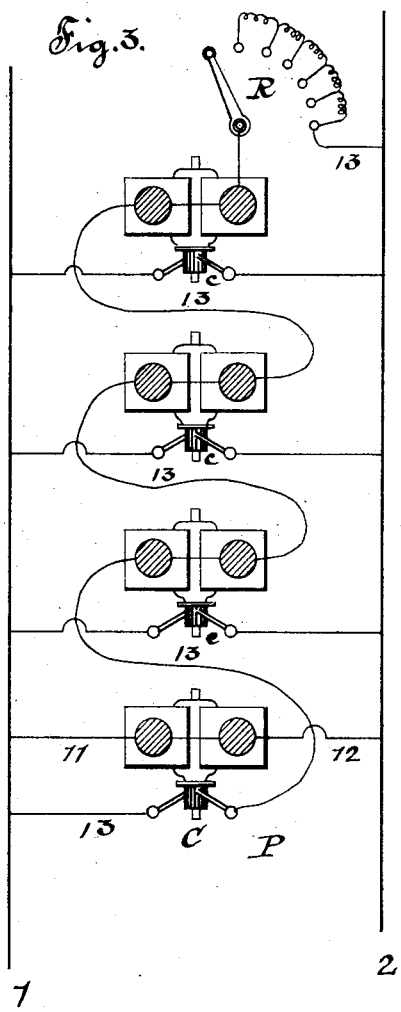
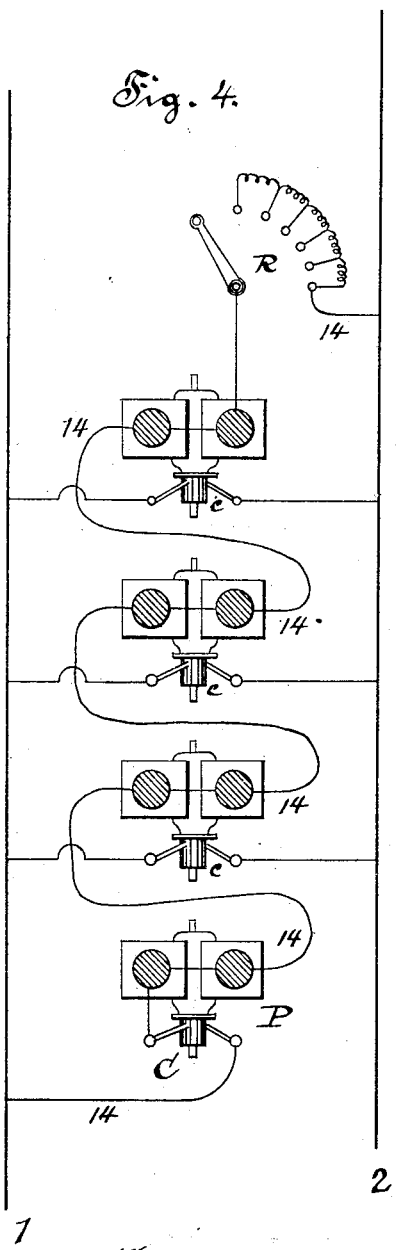
Attest
D. D. Mott
M. J. Hagelt
Inventor
Thos. A. Edison
Attys.

UNITED STATES PATENT OFFICE.

THOMAS A. EDISON, OF MENLO PARK, NEW JERSEY.

REGULATING THE GENERATION OF ELECTRIC CURRENTS.

SPECIFICATION forming part of Letters Patent No. 239,374, dated March 29, 1881.

Application filed January 11, 1881. (No model.)

*To all whom it may concern:*

Be it known that I, THOMAS A. EDISON, of Menlo Park, in the county of Middlesex and State of New Jersey, have invented a new and useful Method and Means for Regulating the Generation of Electric Currents; and I do hereby declare that the following is a full and exact description of the same, reference being had to the accompanying drawings, and to the letters of reference marked thereon.

When a number of generators are used to furnish the current for a system of generation and translation—such, for instance, as shown and explained by me in a prior application for a patent by me made—it is necessary to provide some means for controlling the generation, so that it may be in accord with the demand of the translating devices, which, of course, must vary. Several methods and means for accomplishing this I have shown in prior applications; and the present invention consists in another method and arrangement for accomplishing it.

In the present case the invention consists in combining, with a battery of generators and the main circuit thereof, an electric engine connected in the field-of-force circuit, and arranged to give a counter electro-motive force to that of the current energizing the fields. In such arrangement, as the number of translating devices in circuit lessens, diminishing the work to be done, the generators tend to run at a higher speed. The engine, however, also runs at a higher speed, throwing an increased counter electro-motive force into the field-circuit, weakening the current therein, which, in turn, lessens the magnetic intensity of the field-magnets, causing a diminution of the generated current. If the work to be done increases, the contrary effect is produced.

In the drawings, Figures 1, 2, 3, and 4 represent diagrammatically different arrangements, all, however, containing the arrangement noted.

Figure 2:
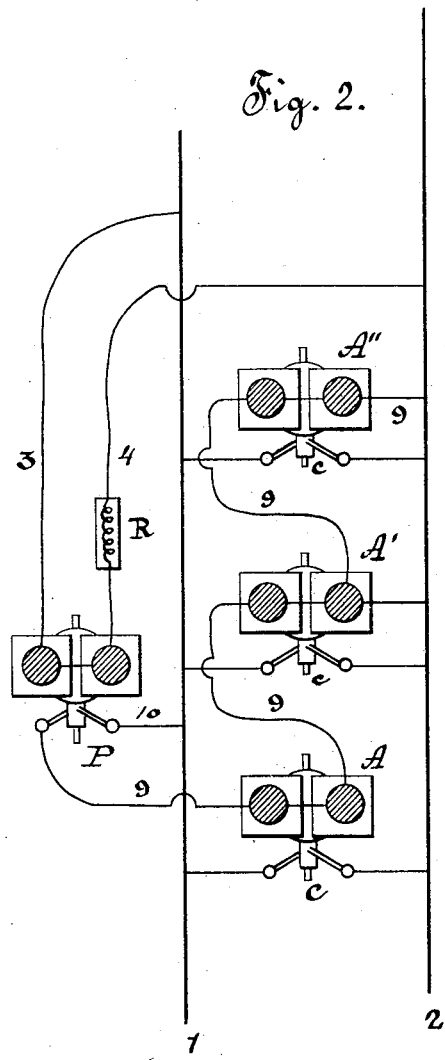

In these drawings, P represents the engine. In Figs. 1 and 2 its field-coils are in a multiple-arc circuit 3 4 to the main circuit 1 2.

A A' A'' are the generators, with their armatures connected to the main circuit in multiple arcs by the conductors $a$ $a'$.

In Fig. 1 the engine P is connected by multiple arcs 6 7 8 through the fields of the generators. In Fig. 2 it is connected by 9 through them in series. In either case P is energized as an engine from the main circuit, and the fields of the generators are energized from the same circuit, and the counter electro-motive force which P sends through the fields in opposition to the current therein from the main circuit will be proportioned to the rate of speed given P, which will be proportionate to that of the generators, as all are energized from the same circuit, which is fed by the current from the generators. As the rate of speed of the generators depends upon the resistance in the exterior circuit, as such resistance lessens, the machines tend to run at a higher speed; but the engine P also tends to run at the same increase of speed, sending a greater electro-motive force back through the fields of the generators, thereby weakening the current around the fields and lessening the generation. By this method a perfect balancing of forces may be effected.

If desired, the engine itself may be adjusted by increasing or decreasing the work which is given it to do, one method thereof being shown in Fig. 1, where a friction-brake, L, with an adjustable weight, is shown.

In Figs. 3 and 4 the same general arrangement is shown, except that in Fig. 4 P is shown as a pure dynamo, its own current passing through its own field. In these latter arrangements adjustable resistances R are included in the field-circuit, to aid in the regulation when desired.

What I claim is—

1. The method of regulating the generative force of a battery of generators, by causing the current energizing the field-of-force magnets to energize an electric engine whose counter electro-motive force regulates the strength of the current energizing the field-of-force magnets, substantially as set forth.

2. The combination, with a battery of dynamo or magneto electric generators, of an electric engine arranged to throw a current of counter electro-motive force through the field-circuit of the generators, substantially as and for the purpose set forth.

3. The combination, with the engine arranged to give the counter electro-motive force, as described, of a brake or other mechanism, giving the engine a definite but adjustable work to perform, so that the electro-motive force may be regulated, substantially as set forth.

This specification signed and witnessed this 16th day of December, 1880.

THOS. A. EDISON.

Witnesses:
H. W. SEELY,
ERNEST J. BERGGREN.